United States Patent [19]

Heidenreich et al.

[11] Patent Number: 5,002,517
[45] Date of Patent: Mar. 26, 1991

[54] FRICTION DISC TORQUE LIMITER

[75] Inventors: David C. Heidenreich, Akron; Keith A. Nichols, North Canton, both of Ohio

[73] Assignee: Power Transmission Tech., Inc., Sharon Center, Ohio

[21] Appl. No.: 498,440

[22] Filed: Mar. 26, 1990

Related U.S. Application Data

[62] Division of Ser. No. 432,475, Nov. 7, 1989.

[51] Int. Cl.$^5$ ............................................. F16D 7/02
[52] U.S. Cl. ................................... 464/48; 192/56 R
[58] Field of Search ................................. 464/45–48; 192/56 R

[56] References Cited

U.S. PATENT DOCUMENTS

| | | | |
|---|---|---|---|
| 2,655,015 | 10/1953 | Linder | 464/48 X |
| 2,872,794 | 2/1959 | Slomer | 464/48 X |
| 2,977,779 | 4/1961 | Steinke et al. | 464/48 |
| 3,025,686 | 3/1962 | Lewis | 464/48 X |
| 3,038,576 | 6/1962 | Simpson | 464/48 X |
| 3,090,213 | 5/1963 | Lindgren | 464/48 |
| 4,401,426 | 8/1983 | Heidenreich | 464/48 X |
| 4,645,472 | 2/1987 | Heidenreich | 464/48 |
| 4,661,083 | 4/1987 | Heidenreich et al. | 464/48 X |

FOREIGN PATENT DOCUMENTS 0400023  1/1946  Italy ...................................... 464/48

Primary Examiner—Joseph J. Hail, III
Assistant Examiner—William G. Battista, Jr.
Attorney, Agent, or Firm—Renner, Kenner, Greive, Bobak, Taylor & Weber

[57] ABSTRACT

A torque limit for interconnecton with a pair of coaxial shafts includes a stack of friction and separator discs alternately splined to drive shaft and to a housing affixed to a driven shaft. In a first embodiment, an annular ring receives a plurality of spring pistons for forcefully engaging the discs with each other. An inner separator disc is secured to an end of the drive shaft and an end plate is fixedly secured to the housing, such plates being in frictional contacting engagement with each other. With the inner disc being affixed to the drive shaft, restricted from both lateral and radial movement with respect thereto, bearing and spline corrosion and wear is minimized such that repair and maintenance costs are significantly reduced. In another embodiment, the discs are interposed between a pair of end plates fixed to an input hub. A bearing is interposed between one such end plate and an end plate of the output hub. The end plate of the output hub is fixedly secured to a stationary end friction plate. A plurality of torque pins interconnect the pair of end plates of the input hub and interconnect separator plates of the disc stack. A plurality of spring cup assemblies within the disc stack define the characteristic break away torque.

13 Claims, 2 Drawing Sheets

FRICTION DISC TORQUE LIMITER

This is a division of application Ser. No. 432,475, filed Nov. 7, 1989.

TECHNICAL FIELD

The invention herein resides in the art of torque limiting devices and, more particularly, to such devices adapted for coupling a drive shaft to a driven shaft for concurrent rotation at torque loads below a particular level. When the torque load on the system exceeds such level, the torque limiter provides for slippage between the two shafts, preventing damage to the system.

BACKGROUND ART

Torque limiting clutches and couplers are well known in the art. Typically, they are placed between a drive source and a driven load to prevent damage to the drive system. A torque limiting clutch or coupler is interposed between a drive shaft and a driven shaft, interconnecting the drive source and driven load, to allow for slippage between the two at torque loads exceeding a predetermined level.

Typically, torque limiters such as the clutches and couplers just described comprise a plurality of interleaved friction and separator discs alternately splined to the drive and driven shaft, either directly or through appropriate hubs or housings. In such torque limiters, relative rotation of the shafts is accommodated by bearings at either end of the coupling device, such bearings typically being characterized by degrees of radial looseness. Such looseness, not only in the bearings, but also at the splines of the friction discs, gives rise to unacceptable levels of wear and corrosion on both the bearings and the splines, requiring the down time and cost incident to frequent repair and replacement of parts. Additionally, as wear and corrosion increases prior to the time for replacement or repair, the efficacy of the system is diminished.

Prior torque limiters have not attended to concentricities of the input and output hubs by providing for fixed interconnection between the output hub and a fixed friction end plate. Neither have such torque limiters provided for rigidity and alignment of the elements thereof by interconnecting a pair of end plates with a stack of separator plates therebetween, such interconnection being achieved by a plurality of torque pins. As a consequence of the shortcomings of the prior art structures, a pair of bearings, one at each end of the torque limiter, has been provided in some assemblies to assure reliable operation of the torque limiter.

The prior art of torque limiters further does not adequately provide for protection against axial thrusts in the shafts in both axial directions without significant risk of damage to the torque limiter system. In other words, while torque limiters are provided for torque protection, little thought is given to the impact of axial loads on the shafts with respect to the torque characteristics.

The prior art systems are totally unacceptable for use in massive, complex systems such as drive shafts of sea going vessels and the like. The time and cost involved in accessing and repairing torque limiters on such systems mandates that they not be given to defeat by wear and corrosion. Further, such systems are often exposed to significant changes in axial loads which, in the prior art, adversely impact the drive system and torque limiting capabilities.

For a number of reasons, including those presented above, the drive shafts of seagoing vessels have typically not employed friction-type torque limiters but, instead, have employed the rudimentary concepts of shear pins or the like. Such structures are not given to losses of effectiveness nor do they require service for corrosion and the like. However, when the shear pin performs its intended function, the sheared pin must be replaced. In systems such as the drive train of a seagoing vessel, such replacement time and costs are inordinate.

DISCLOSURE OF INVENTION

In light of the foregoing, it is a first aspect of the invention to provide a torque limiter which reduces the wear on the bearings of the torque limiting system.

Another aspect of the invention is the provision of a torque limiter of the disc stack type in which reduced wear is attained at the splines of the system.

Yet a further aspect of the invention is the provision of a torque limiter which maintains concentricity of the drive and driven shafts.

Still a further aspect of the invention is the provision of a torque limiter which includes means for absorbing axial loads and misalignment on the shafts.

Yet a further aspect of the invention is the provision of a torque limiter in which the torque characteristics of the torque limiter remain substantially constant throughout the wear life of the system.

An additional aspect of the invention is the provision of a torque limiter in which concentricities of the input and output hubs are maintained by interconnection of the output hub to a fixed friction end plate and keeper plate.

Another aspect of the invention is the provision of a torque limiter in which torque pins interconnect pairs of end plates and receive a stack of separator plates interleaved with friction plate assemblies.

Still another aspect of the invention is the provision of a torque limiter in which a single bearing may be employed between input and output hub assemblies.

The foregoing and other aspects of the invention which will become apparent as the detailed description proceeds are achieved by a torque limiter, comprising: a first shaft; a second shaft; a housing fixedly secured to said first shaft; a stack of friction and separator discs alternately connected to said housing and said second shaft; first means positioned at a first end of said stack for urging said discs into frictional contacting engagement with each other; and a first plate fixed to said second shaft at a second end of said stack opposite said first end, said first means urging said stack onto said first plate.

Other aspects of the invention which will become apparent herein are attained by a torque limiter, comprising: a first shaft having a housing fixedly attached thereto; a second shaft; a stack of friction and separator discs alternately connected to said housing and said second shaft, said friction discs being axially moveable with respect to said second shaft, but radially restrained; an annular ring received upon a first bearing on said second shaft at a first end of said stack of friction discs, said annular ring maintaining piston means forcefully engaging said first end of said stack and urging said discs into frictional contacting engagement with each other; a first plate fixedly secured to said second shaft at a second end of said stack, said piston means urging said stack onto said first plate; and an end plate secured to said housing and received upon a second bearing interposed between said end plate and said first plate.

Additional aspects of the invention are attained by a torque limiter, comprising: an input hub; an output hub; a stack of interleaved friction discs and separator discs interconnected between said input hub and output hub; a friction end plate securedly attached to one end of said output hub, preventing both axial and radial movement of said friction end plate with respect to said output hub; and a first end plate affixed to said input hub and in frictional contacting engagement with said friction end plate.

BRIEF DESCRIPTION OF DRAWINGS

For a complete understanding of the objects, techniques and structure of the invention reference should be made to the following detailed description and accompanying drawings wherein.

BEST MODE FOR CARRYING OUT THE INVENTION

Figure 1:
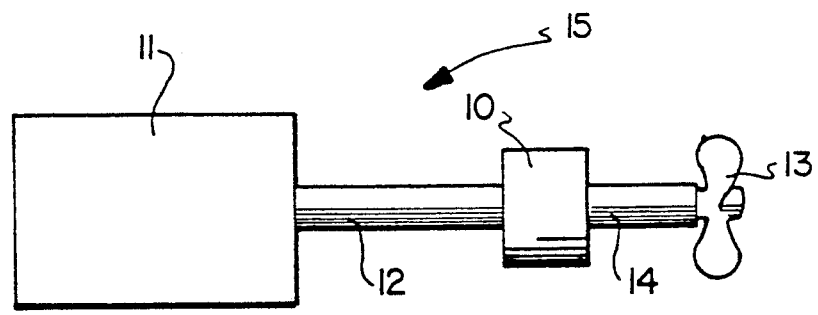
FIG. 1 is a block diagram of a power drive system according to the invention.

Referring now to the drawings and more particularly FIG. 1, it can be seen that a power drive system of the type in interest is designated generally by the numeral 15. While the concept of the invention may be applied to various power drive mechanisms, it is contemplated for use in association with the power drive of a seagoing vessel, providing for torques exceeding one million pound-feet, and employing shafts having a diameter on the order of nineteen (19) inches. In the system 15 of FIG. 1, torque limiter 10 is interposed between a drive shaft 12 and a driven shaft 14, the drive shaft being connected to a appropriate motor 11 or other suitable power source, and the driven shaft 14 being connected to a propeller 13 or other appropriate load. As will be appreciated by those skilled in the art, the torque limiter 10 provides a coupling between the drive shaft 12 and driven shaft 14, allowing the two to drive in unison so long as the torque applied to the shaft 12 does not exceed a certain limit in driving the load on the shaft 14. When such limit is exceeded, the torque limiter 10 slips allowing the shaft 12 to rotate relative to the shaft 14 while transmitting the characteristic torque of the torque limiter.

Figure 2:
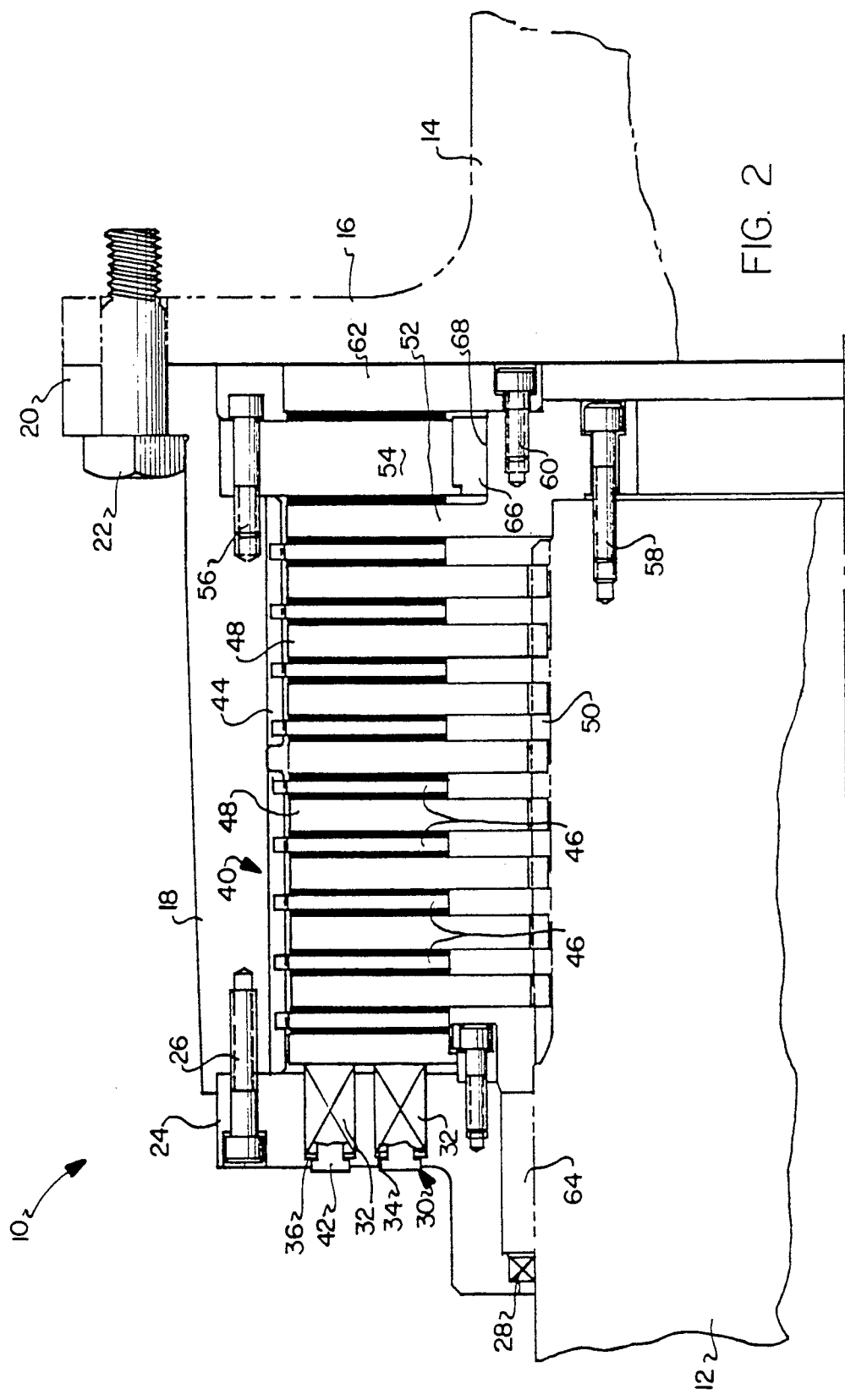
FIG. 2 is a cross sectional view of a first embodiment of the torque limiter of the invention.

Referring now to FIG. 2, it can be seen that the flange 16 on the shaft 14 is appropriately connected to a substantially cylindrical housing 18 at a flange 20 encircling one end thereof. Appropriate bolts 22, or other suitable fastening means, provides for the interconnection of the flanges 16, 20. An end plate or annular disc 24 encircles a drive shaft 12 and is affixed to an end of the housing 18 by means of bolts 26 or other appropriate fasteners. A ring-like seal 28 is interposed between the annular disc 24 and a shaft 12 to seal and protect a bearing 64 similarly interposed between the shaft 12 and disc 24.

A plurality of bores 30 are preferably uniformly spaced about a central axis of the annular disc 24 and are configured to receive spring pin assemblies or spring piston assemblies 32. The bores 30 are counter bored to provide a shoulder 34 at one end thereof for receiving an abutting washer 36 for nesting engagement of the assembly 32. It will be appreciated by those skilled in the art that the spring pin assemblies 32 are substantially similar in nature to those shown in U.S. Pat. Nos. 4,401,426, 4,645,472 and 4,661,083, owned by the assignee of the instant invention. The spring pin assemblies or spring pistons 32 extend from the shoulder-washer engagement 34, 36 and urge against a pressure plate 38 provided at one end of a torque disc stack 40.

As will be appreciated by those skilled in the art, each of the spring piston assemblies 32 includes a compressed spring which demonstrates a characteristic of fixed force against the pressure plate 38. Dependent upon the nature and size of the spring pistons 32, as well as the number of such assemblies received within the bores 30 of the annular disc 24, the characteristic torque of the torque limiter 10 can be established. As has previously been established in the art, precompression of the springs of the assemblies 32 allows for substantially constant force characteristics for the assemblies 32 over the usable life of the associated torque disc stack 40. Indeed, the characteristic force and resultant torque characteristics employing the spring pistons 32 are found to diminish only approximately ten percent over the useful life of the torque limiter unit. To assist in monitoring and determining the wear on the torque disc stack 40, a wear indicator pin 42 extends from the back of each of the spring pin assemblies 32, the degree of extension of the pin from the bore 30 in the disc 24 being directly proportional to remaining wear available in the assembly 10.

Splines 44 extend axially along inner circumferential surfaces of the housing 18. Keyed to the splines 44 are a plurality of friction discs 46. The friction discs 46 which are splined to the housing 18 are interleaved with a corresponding number of separator discs 48 which are keyed to splines 50 which extend axially along the outer circumferential surface of the shaft 12. As will be readily appreciated by those skilled in the art, the splines 44, 50 allow the respectively received discs 46, 48 to move laterally or axially with respect to the shaft 12 and housing 18, but restrict any radial movement thereof. It will also be appreciated that discs 46 could be separator discs, in which case the discs 48 would be friction discs.

An inner disc 52 serves as a separator plate between the disc stack 40 and a friction end plate 54 which is connected to the housing 18 by means of a plurality of bolts 56. As shown, the end plate 54 is received by a sleeve bearing 66 which, in turn, is received upon a race 68 about a hub portion of the inner friction disc 52. Bolts 56 secure the end plate 54 to the housing 18 and, in like manner, bolts 58 secure the inner separator disc 52 to the drive shaft 12. Accordingly, the inner disc 52, the final separator disc affixed to the shaft 12, is not splined, but is bolted and thereby fixed both radially and axially to the shaft 12. Such structure serves to reduce wear of both the bearings 64, 66 as well as wear at the spline and key areas 44, 50. By preventing relative movement between the housing 18 and the shaft 12, significant reductions in wear and maintenance are attained.

Bolts 60 secure a thrust plate 62 to the inner disc 52 and, accordingly, to the drive shaft 12. As shown, the friction end plate 54 is fixedly secured to the cylindrical housing 18 and is sandwiched between the inner separator disc 52 and the thrust plate or bearing 62, both of which are attached to the drive shaft 12.

In operation, the spring piston assemblies 32 urge against the pressure plate 38 to bring the interleaved discs 46, 48 into frictional engagement with each other. Dependent upon the force imparted to the plate 38 by the assemblies 32, a characteristic break-away torque is thus established between the input shaft 12 and output shaft 14. When that torque is exceeded, the discs 48 are allowed to slide by the discs 46 and relative rotational movement is attained between the coaxial shafts 12, 14.

An important feature of the instant invention is the accommodation of axial loads as well as radial torques. It will be appreciated that a force may be induced into the shaft 14 from the right to the left as shown in FIG. 2 such as, for example, if the seagoing vessel were moving in reverse and the propeller at the end of the shaft 14 hit an abutment. In such a case, the axial force would be transferred from the flange 16 of the shaft 14 into the end plate 54, through the fixed separator plate 52, and thence into the shaft 12. An axial thrust load in the opposite direction on the shaft 14 is taken through the housing 18 to the annular disc 24, through the spring piston assemblies 32, and into the friction disc pack 40. At the end of the pack 40, the force is imparted to the inner separator disc 52 and again into the end of the shaft 12. It will be appreciated that when this reverse thrust exceeds the spring force of the spring piston assemblies 32, the additional thrust load is carried from the housing 18 to the end plate 54, to the thrust plate 62, and thence to the inner separator disc 52 and shaft 12.

It should be appreciated that axial forces onto the shaft 14 do not defeat the operability of the torque limiter 10, but means are provided for transferring such axial forces from one shaft to the other.

Figure 3:
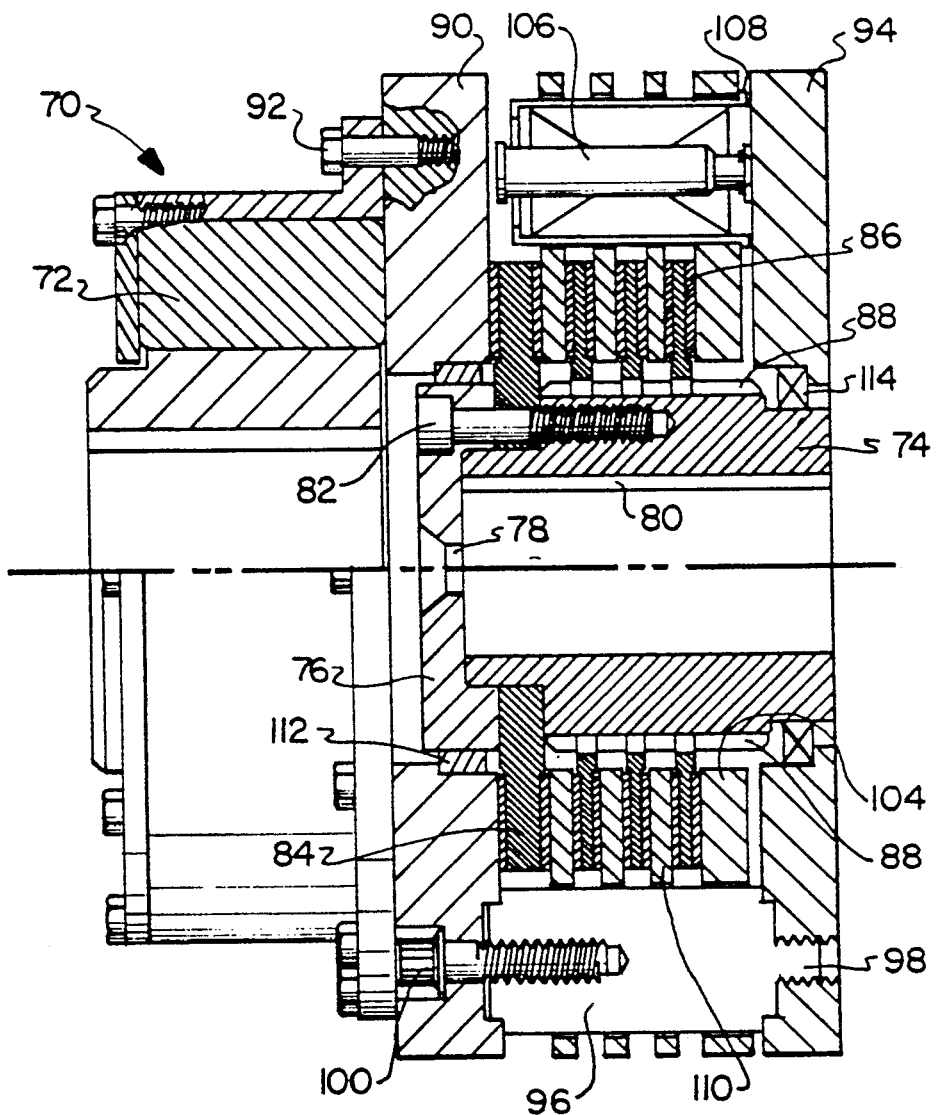
FIG. 3 is a cross sectional view of a second embodiment of the torque limiter of the invention.

With reference now to FIG. 3, it can be seen that a torque limiter according to a second embodiment of the invention is designated generally by the numeral 70. In standard fashion, the torque limiter 70 comprises an input coupling or hub 72 in communication with an output hub 74. Typically, the input hub 72 would be connected to a motor or other power source, with the output hub 74 being connected to a unit to be driven.

As a part of the invention, a keeper plate 76 is received over an end of the output hub 74, the keeper plate 76 being housed to receive an end of the hub 74 as shown. A counterbore 78 in the keeper plate 76 is provided to receive a bolt or other securing device for interengagement with a driven shaft to be received internally of the output hub 74 in engagement with drive splines or keys 80.

A plurality of bolts 82, are spaced about the keeper plate 76 to secure the same to the output hub 74. Also rigidly affixed to the hub 74 and maintained between a shoulder thereon and the keeper plate 76 is a friction end plate 84. It will be appreciated that the plate 84 is fixed, both radially and axially, with respect to the hub 74 and is maintained in concentricity therewith as is the keeper plate 76. A plurality of friction discs or plate assemblies 86 are splined as at 88 to the output hub 74. Such engagement allows for axial movement of the friction discs 86 along the hub 74, but restricts any radial movement.

A first end plate 90 is attached to the input hub 72 by means of a plurality of bolts 92 about the respective peripheries thereof. A second end plate 94 is secured to the first end plate 90 by means of a plurality of torque pins 96. In a preferred embodiment, two or more such torque pins 96 would be uniformly spaced circumferentially around the plates 90, 94. As shown, each of the torque pins 96 is threadly engaged with the second end plate 94 as at 98. Bolts 100 pass through the first end plate 90 for receipt within tapped bores within the torque pins 96. A recess or housed-out portion 102 of the first end plate 90 receives a neck or extension of the torque pin 96 for nesting engagement.

A pressure plate 104 is maintained adjacent the second end plate 94 and is received by the torque pins 96 which pass through bores appropriately placed therein. The pressure plate 104 is also bored to receive a plurality of spring cup assemblies 106 uniformly spaced circumferentially about the assembly 70. The spring cup assemblies 106 are substantially identical to those shown and described in U.S. Patents presented above, and comprise a spring and piston received within a cup having a flange 108 about a periphery thereof. The piston urges against the second end plate 94 and transmits force through the cup to the flange 108 such that the pressure plate 104 is urged to the left or away from the second end plate 94 as shown in FIG. 3. A plurality of separator discs 110 are received by the torque pins 96 and are bored to receive the spring cup assemblies 106. The separator discs 110 are interleaved with the friction discs 86 to comprise a friction disc stack having a characteristic break-away torque associated therewith and defined by the nature and number of spring cup assemblies 106 employed.

It will be appreciated that the separator discs are interconnected with the input hub 72 by means of the end plates 90, 94 and torque pins 96. Such interconnection allows for a significant increase in separator disc mass and surface area as compared to splined connection. Accordingly, heat dissipation is enhanced, such being particularly beneficial in systems where frequent torque overloads are experienced. The friction plates 86 are splined to the output hub 74, while the fixed friction end plate 84 is bolted thereto. Accordingly, the maximum torque which may be transmitted by the torque limiter 70 from the input hub 72 to the output hub 74 is as determined by the number and nature of spring cup assemblies 106, as well as other standard parameters such as the size and nature of the friction discs 86 and separator discs 110, as well as the friction end plate 84 which is in frictional engagement with the first end plate 90.

When torque applied to the torque limiter 70 exceeds the characteristic breakaway torque, relative rotational movement between the input hub 72 and output hub 74 occurs. To accommodate such relative rotational movement, a sleeve bearing 112 is interposed between the first end plate 90 connected to the input hub, and the keeper plate 76 connected to the output hub 74. Because of the provision of the fixed friction end plate 84 interconnected with the output hub 74 along with the keeper plate 76, the structure associated with the output hub 74 is well aligned and the elements thereof are maintained in concentricity with each other. Accordingly, it has been found that a single bearing 112 may be interposed between the input hub and output hub as by interengagement between the keeper plate 76 and first end plate 90, obviating the need for a second bearing at the opposite end of the assembly. Indeed, that end of the assembly has been found to require only a seal 114 to prevent dirt and debris from entering the area of the splines 88.

As presented above, the characteristic torque of the torque limiter 70 is determined by the nature and number of spring cup assemblies 106, as well as the size and number of friction discs 86 and separator plates 110. As long as the torque load from the input hub 72 to the output hub 74 is less than the characteristic torque, the two hubs rotate in unison. The force to achieve such rotation is transmitted from the torque pins 96 to the separator plates 110 and thence to the friction plates 86 and to the output hub 74. Should the torque load exceed the characteristic break-away torque, relative rotation between the friction discs 86 and the separator discs 110 will occur so that only the characteristic torque is transferred from the input hub to the output hub. Of course, it will be understood by those skilled in the art that the transfer of torque is primarily achieved through the friction end plate 84 and the first end plate 90 during normal operation at torques below the characteristic break-away torque. By rigidly securing and aligning the friction end plate 84 to the output hub 74, and by similarly aligning the structure associated with the input hub 72 such that the first end plate 90 is coaxial with the friction end plate 84, efficient torque transfer can take place while employing but a single bearing and seal in the unit. The result is reduced wear on the bearings, spline, and torque limiter 70 as a whole.

It should now be apparent that a concept of the invention is to provide for rigidity and integrity in a torque limiter by providing a fixed end plate, acted upon by the spring forces exerted upon the torque disc stack.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A torque limiter, comprising:
   a first shaft;
   a second shaft;
   a housing fixedly secured to said first shaft;
   a stack of friction and separator discs alternately connected to said housing and said second shaft;
   first means positioned at a first end of said stack for urging said discs into frictional contacting engagement with each other;
   a first plate fixed to said second shaft at a second end of said stack opposite said first end, said first means urging said stack into said first plate; and
   a pair of bearings, one at each end of said stack, operatively interposed between said housing and said shaft, one of said bearings being received upon a race on said first plate.

2. The torque limiter according to claim 1, wherein said discs are alternately splined to said housing and said second shaft and are adapted for axial movement with respect to said housing and shaft.

3. The torque limiter according to claim 1, further comprising an end plate secured to said housing and in engagement with said first plate.

4. The torque limiter according to claim 3, wherein said end plate is received upon said one of said bearings.

5. The torque limiter according to claim 3, further comprising a thrust plate connected to said first plate, said end plate being maintained between said first plate and said thrust plate.

6. The torque limiter according to claim 3, wherein said first means comprises an annular ring secured to said housing and received upon one of said bearings on said second shaft.

7. The torque limiter according to claim 6, wherein said annular ring receives a plurality of spring biased piston assemblies urging against said stack of friction discs.

8. The torque limiter according to claim 7, wherein said first and second shafts are coaxial.

9. A torque limiter, comprising:
   a first shaft having a housing fixedly attached thereto;
   a second shaft;
   a stack of friction and separator discs alternately connected to said housing and said second shaft, said friction discs being axially movable with respect to said second shaft, but radially restrained;
   an annular ring received upon a first bearing on said second shaft at a first end of said stack of discs, said annular ring maintaining piston means forcefully engaging said first end of said stack and urging said discs into frictional contacting engagement with each other;
   a first plate fixedly secured to said second shaft at a second end of said stack, said piston means urging said stack onto said first plate; and
   an end plate secured to said housing and received upon a second bearing interposed between said end plate and said first plate.

10. The torque limiter according to claim 9, wherein said piston means comprises a plurality of spring biased piston assemblies uniformly spaced around said second shaft within said annular ring.

11. The torque limiter according to claim 10, wherein said spring biased piston assemblies include a wear indicator extending therefrom for providing an indicia of the remaining service life of the torque limiter.

12. The torque limiter according to claim 9, further comprising a thrust plate affixed to said first plate.

13. The torque limiter according to claim 12, wherein said end plate is interposed between said first plate and said thrust plate.

* * * * *